(12) United States Patent
Zhang et al.

(10) Patent No.: US 10,985,848 B2
(45) Date of Patent: Apr. 20, 2021

(54) METHOD AND APPARATUS FOR RADIO LINK MONITORING

(71) Applicant: Apple Inc., Cupertino, CA (US)

(72) Inventors: Yushu Zhang, Beijing (CN); Wook Bong Lee, Pleasanton, CA (US); Dae Won Lee, Hillsboro, OR (US); Seunghee Han, San Jose, CA (US); Alexei Davydov, Niz (RU); Guotong Wang, Beijing (CN); Gregory Morozov, Niz (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/483,982

(22) PCT Filed: May 15, 2018

(86) PCT No.: PCT/CN2018/086838
§ 371 (c)(1),
(2) Date: Aug. 6, 2019

(87) PCT Pub. No.: WO2018/210226
PCT Pub. Date: Nov. 22, 2018

(65) Prior Publication Data
US 2020/0021372 A1 Jan. 16, 2020

(30) Foreign Application Priority Data
May 15, 2017 (WO) ................ PCT/CN2017/084335

(51) Int. Cl.
H04B 17/327 (2015.01)
H04B 7/0413 (2017.01)
(Continued)

(52) U.S. Cl.
CPC ......... *H04B 17/327* (2015.01); *H04B 7/0413* (2013.01); *H04B 7/0695* (2013.01); *H04B 7/088* (2013.01)

(58) Field of Classification Search
CPC ..................................................... H04B 17/327
(Continued)

(56) References Cited

U.S. PATENT DOCUMENTS

2014/0286176 A1* 9/2014 Ro .................... H04W 24/04
370/242
2016/0183234 A1* 6/2016 Sung ................. H04W 72/046
370/329

(Continued)

FOREIGN PATENT DOCUMENTS

CN 106255209 A 12/2016
WO 2018083624 A1 5/2018

OTHER PUBLICATIONS

International Patent Office—International Search Report and Written Opinion dated Aug. 1, 2018, from International Application No. PCT/CN2018/086838, 10 pages.

(Continued)

Primary Examiner — Lihong Yu
(74) Attorney, Agent, or Firm — Fish & Richardson P.C.

(57) ABSTRACT

Provided herein are method and apparatus for perform radio link monitoring (RLM) based on a Reference signal (RS). An embodiment provides a user Equipment (UE) comprising circuitry configured to: decode a Reference Signal (RS) received from an access node; and determine beam quality for one or more beam pair links (BPLs) of the RS between the UE and the access node based on the decoded RS, wherein each of the BPLs comprises a transmit (Tx) beam of the access node and a receive (Rx) beam of the UE. Also provided is a procedure of RLM. At least some embodiments allow for beam recovery request for UE beam refinement, (Continued)

and allow for determining whether radio link failure (RLF) occurs.

23 Claims, 8 Drawing Sheets

(51) Int. Cl.
*H04B 7/06* (2006.01)
*H04B 7/08* (2006.01)

(58) Field of Classification Search
USPC .......................................................... 375/267
See application file for complete search history.

(56) References Cited

U.S. PATENT DOCUMENTS

| | | | |
|---|---|---|---|
| 2017/0134964 A1* | 5/2017 | Yu | ........................... H04L 5/005 |
| 2018/0049042 A1 | 2/2018 | Yu et al. | |
| 2020/0014453 A1* | 1/2020 | Takeda | .................. H04B 7/088 |

OTHER PUBLICATIONS

Samsung, "Discussion on recovery from beam failure," 3GPP TSG RAN WG1 Meeting #88bis, R1-1705343, Agenda item: 8.1.2.2.2, Apr. 3-7, 2017, Spokane, USA, 6 pages.
Chittl, "Discussion on beam failure recovery," 3GPP TSG RAN WG1 Meeting #89, R1-1708380, Agenda Item: 7.1.2.2.2, May 15-19, 2017, Hangzhou, P.R. China, 5 pages.
International Preliminary Report on Patentability in PCT Appln. No. PCT/CN2018/086838, dated Nov. 19, 2019, 6 pages.
Catt, "Discussion on DL beam recovery," 3GPP Draft; R1-1707477, 3GPP TSG RAN WG1 Meeting #89, Agenda Item: 7.1.2.2.2, Hangzhou, China, May 15-19, 2017, 5 pages.
EP Search Report in European Appln. No. 18802 571.2, dated Dec. 2, 2020, 13 pages.
Huawei et al., "Beam failure recovery," 3GPP Draft; R1-1708135, 3GPP TSG RAN WG1 Meeting #89, Hangzhou, China, May 15-19 2017, 9 pages.
NTT Docomo, "Views on beam recovery," 3GPP Draft; R1 1718193, 3GPP TSG RAN WG1 Meeting #90b, Agenda Item: 7.2.2.4, Prague, CZ, Oct. 9-13, 2017, 9 pages.

* cited by examiner

METHOD AND APPARATUS FOR RADIO LINK MONITORING

CROSS REFERENCES TO RELATED APPLICATIONS

This application is a national phase entry under 35 U.S.C. § 371 of International Application No. PCT/CN2018/086838, filed May 15, 2018, entitled "METHOD AND APPARATUS FOR RADIO LINK MONITORING," which claims priority to International Application No. PCT/CN2017/084335 filed on May 15, 2017, entitled "BEAM AND RADIO LINK MONITOR", which are incorporated by reference herein in their entireties for all purposes.

TECHNICAL FIELD

Embodiments of the present disclosure generally relate to apparatus and method for wireless communications, and in particular to radio link monitoring (RLM).

BACKGROUND ART

To maintain a radio link between a user equipment (UE) and an access node such as a next Generation NodeB (gNB), beam quality for one or more beam pair links (BPLs) between the UE and the access node (for example, one or more BPLs used for control channel including common control channel and UE specific control channel) should be good enough. Therefore, it is important and necessary to perform beam monitoring or RLM to monitor beam quality for BPLs.

SUMMARY

An embodiment of the disclosure provides an apparatus for a user equipment (UE) including circuitry configured to: decode a Reference Signal (RS) received from an access node; and determine beam quality for one or more beam pair links (BPLs) of the RS between the UE and the access node based on the decoded RS, wherein each of the BPLs comprises a transmit (Tx) beam of the access node and a receive (Rx) beam of the UE.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

In a Multiple-Input and Multiple-Output (MIMO) system operating in high band, hybrid beamforming can be applied. An access node (e.g, a gNB) and a UE may maintain a plurality of beams. There may be multiple BPLs between the access node and the UE, which can provide good beamforming gain. A good BPL can help to increase link budget. Therefore, monitoring beam quality for BPLs is very important.

The present disclosure provides approaches to perform RLM. In accordance with some embodiments of the disclosure, beam quality for one or more BPLs between a UE and an access node may be determined based on a Reference Signal (RS) received from the access node so as to perform RLM. In accordance with some embodiments of the disclosure, when the beam quality for all of the BPLs is not good enough to meet a predetermined or configured threshold requirement, a beam recovery request may be encoded for transmission to the access node, or out-of-synchronization (out-of-sync) may be declared directly. In accordance with some embodiments of the disclosure, if the UE cannot find out a good Rx beam to meet the threshold requirement, out-of-sync may be declared. Radio link failure (RLF) may be triggered if a predetermined or configured number of consecutive out-of-sync are declared.

In accordance with some embodiments of the disclosure, the term "beam" or "beam pail link (BPL)" of a RS discussed herein may refer to an antenna port of the RS.

Figure 1:
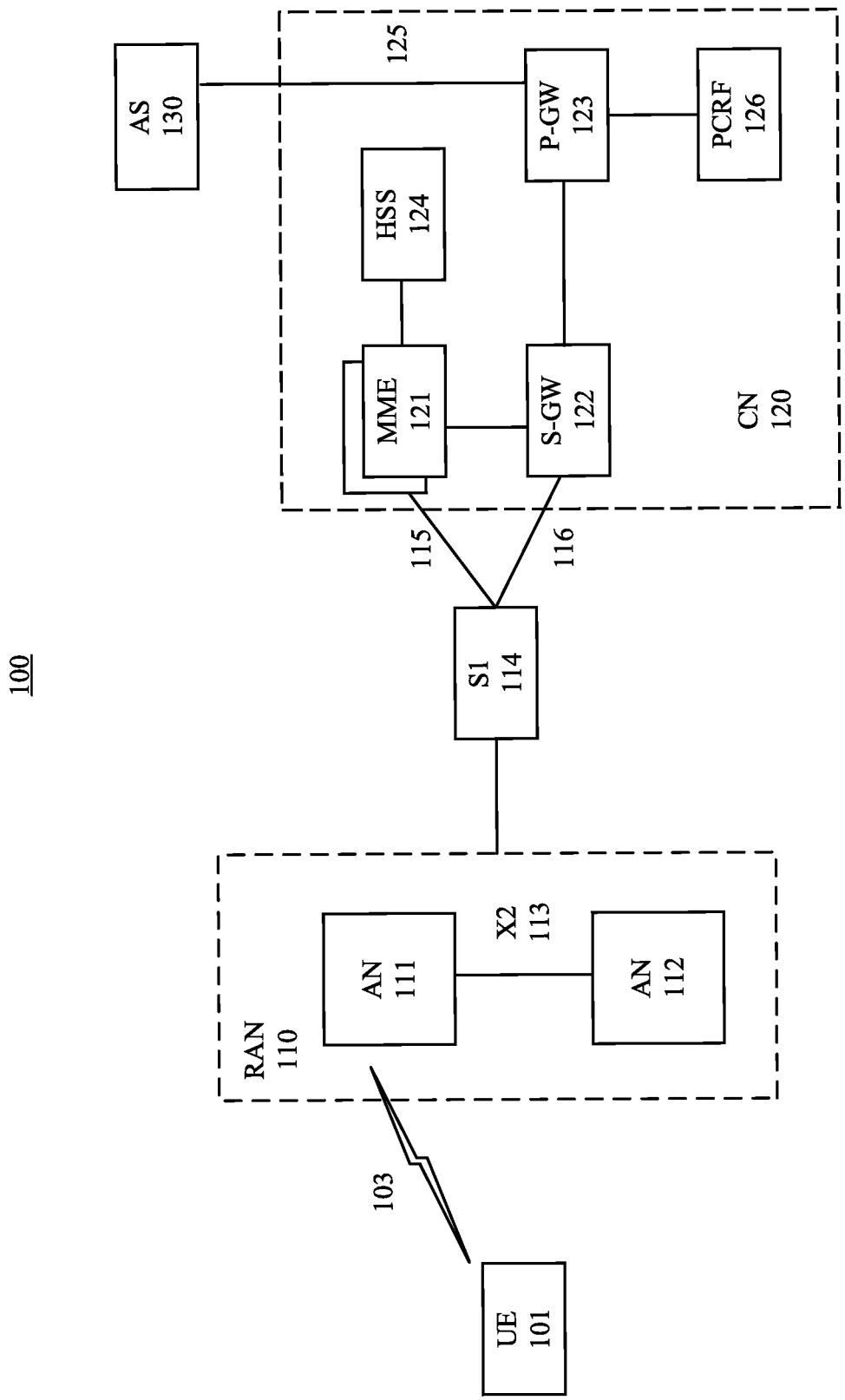
FIG. 1 shows an architecture of a system of a network in accordance with some embodiments of the disclosure.

FIG. 1 illustrates an architecture of a system 100 of a network in accordance with some embodiments. The system 100 is shown to include a user equipment (UE) 101. The UE 101 is illustrated as a smartphone (e.g., handheld touchscreen mobile computing devices connectable to one or more cellular networks), but may also include any mobile or non-mobile computing device, such as a personal data assistant (PDA), a tablet, a pager, a laptop computer, a desktop computer, a wireless handset, or any computing device including a wireless communications interface.

The UE 101 may be configured to connect, e.g., communicatively couple, with a radio access network (RAN) 110, which may be, for example, an Evolved Universal Mobile Telecommunications System (UMTS) Terrestrial Radio Access Network (E-UTRAN), a NextGen RAN (NG RAN), or some other type of RAN. The UE 101 may utilize a connection 103 which comprises a physical communications interface or layer (discussed in further detail below); in this example, the connection 103 is illustrated as an air interface to enable communicative coupling and may be consistent with cellular communications protocols, such as a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The RAN 110 may include one or more access nodes (ANs) that enable the connection 103. These access nodes may be referred to as base stations (BSs), NodeBs, evolved NodeBs (eNBs), next Generation NodeBs (gNB), RAN nodes, and so forth, and may include ground stations (e.g., terrestrial access points) or satellite stations providing coverage within a geographic area (e.g., a cell). As shown in FIG. 1, for example, the RAN 110 may include AN 111 and AN 112. The AN 111 and AN 112 may communicate with one another via an X2 interface 113. The AN 111 and AN 112 may be macro ANs which may provide lager coverage. Alternatively, they may be femtocell ANs or picocell ANs, which may provide smaller coverage areas, smaller user capacity, or higher bandwidth compared to macro ANs. For example, one or both of the AN 111 and AN 112 may be a low power (LP) AN. In an embodiment, the AN 111 and AN 112 may be the same type of AN. In another embodiment, they are different types of ANs.

Any of the ANs 111 and 112 may terminate the air interface protocol and may be the first point of contact for the UE 101. In some embodiments, any of the ANs 111 and 112 may fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UE 101 may be configured to communicate using Orthogonal Frequency-Division Multiplexing (OFDM) communication signals with any of the ANs 111 and 112 or with other UEs (not shown) over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and Proximity-Based Service (ProSe) or sidelink communications), although the scope of the embodiments is not limited in this respect. The OFDM signals may include a plurality of orthogonal subcarriers.

In some embodiments, a downlink resource grid may be used for downlink transmissions from any of the ANs 111 and 112 to the UE 101, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 101. The physical downlink control channel (PDCCH) may carry information about the transport format and resource allocations related to the PDSCH channel, among other things. It may also inform the UE 101 about the transport format, resource allocation, and H-ARQ (Hybrid Automatic Repeat Request) information related to the uplink shared channel Typically, downlink scheduling (assigning control and shared channel resource blocks to the UE 101 within a cell) may be performed at any of the ANs 111 and 112 based on channel quality information fed back from the UE 101. The downlink resource assignment information may be sent on the PDCCH used for (e.g., assigned to) the UE 101.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an 51 interface 114. In some embodiments, the CN 120 may be an evolved packet core (EPC) network, a NextGen Packet Core (NPC) network, or some other type of CN. In an embodiment, the S1 interface 114 is split into two parts: the S1-mobility management entity (MME) interface 115, which is a signaling interface between the ANs 111 and 112 and MMEs 121; and the S1-U interface 116, which carries traffic data between the ANs 111 and 112 and the serving gateway (S-GW) 122.

In an embodiment, the CN 120 may comprise the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-AN handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the CN 120 and external networks such as a network including an application server (AS) 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In an embodiment, the P-GW 123 is communicatively coupled to an application server 130 via an IP communications interface 125. The application server 130 may also be configured to support one or more communication services (e.g., Voice-over-Internet Protocol (VoIP) sessions, PTT sessions, group communication sessions, social networking services, etc.) for the UE 101 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1. Alternatively or additionally, one or more of the devices of environment 100 may perform one or more functions described as being performed by another one or more of the devices of environment 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
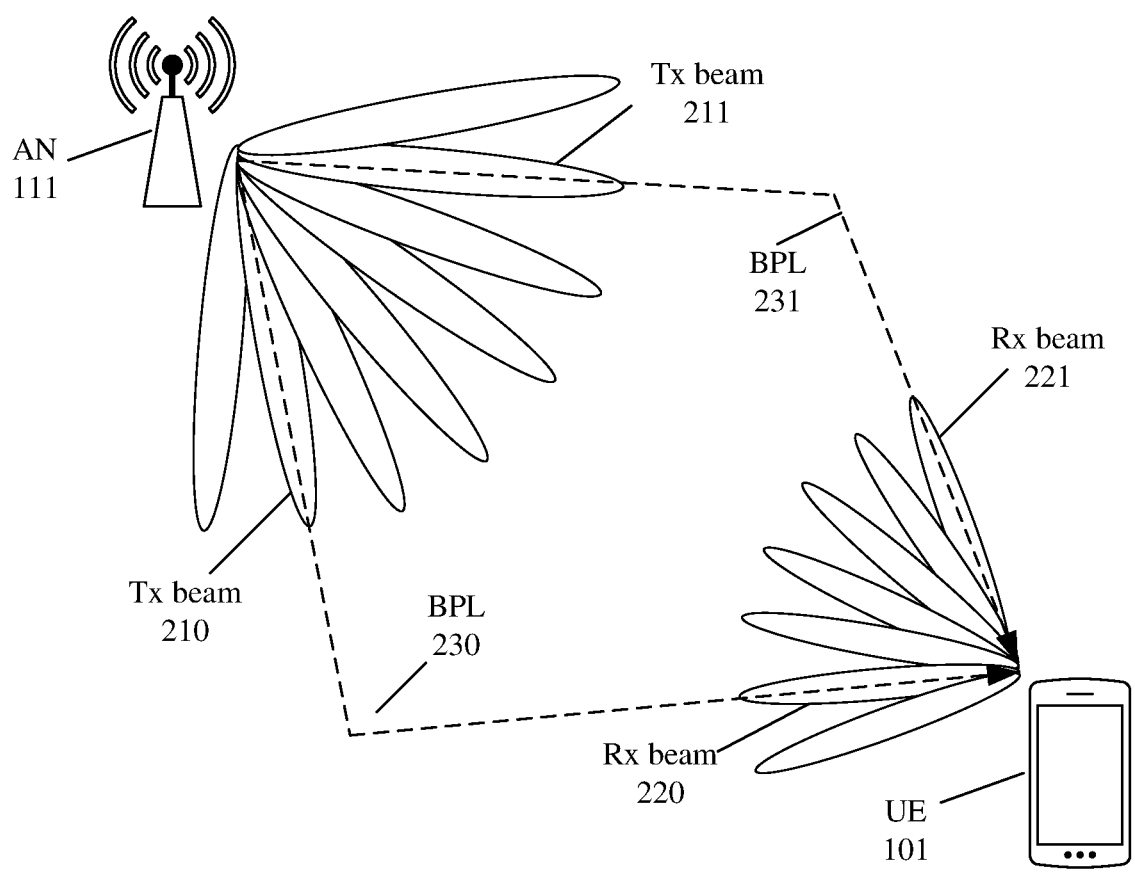
FIG. 2 shows an example for one or more BPLs between a UE and an access node in accordance with some embodiments of the disclosure.

FIG. 2 shows an example for one or more BPLs between a UE and an access node in accordance with some embodiments of the disclosure. In the example of FIG. 2, the AN 111 may maintain a plurality of transmit (Tx) beams including a Tx beam 210 and a Tx beam 211, and the UE 101 may maintain a plurality of receive (Rx) beams including a Rx beam 220 and a Rx beam 221. There may be one or more BPLs between the AN 111 and UE 101, wherein each of the BPLs may be formed by a Tx beam of the AN 111 and a Rx beam of the UE 101. For example, as shown in FIG. 2, a BPL 230 may be formed by the Tx beam 210 of the AN 111 and the Rx beam 220 of the UE 101, and a BPL 231 may be formed by the Tx beam 211 of the AN 111 and the Rx beam 221 of the UE 101.

It should be understood that, the number of Tx beams of the AN 111, Rx beams of the UE 101 and/or BPLs between the AN 111 and the UE 101 illustrated in FIG. 2 is provided for explanatory purposes only and is not limited herein.

As beam quality for one or more BPLs between the AN 111 and the UE 101 may be effected by one or more Tx beams of the AN 111 forming the BPLs and one or more Rx beams of the UE 101 forming the BPLs, there are two possible cases if the beam quality for the BPLs is not good: one is that the Tx beams forming the BPLs are not good, the other is that the Rx beams forming the BPLs are not good. In the former case, in order to improve the beam quality for the BPLs, the best Tx beams of the AN 111 may be selected to form the BPLs, or if a better AN (e.g. AN 112) exists (for example, as the UE 101 moves away from the AN 111 and moves into the coverage area of another AN such as AN 112), the best Tx beams of the better AN may be selected to form the BPLs. In the latter case, namely, if the best Tx beams have already been applied to the BPLs and the Rx beams of the BPLs are not good, the best Rx beams of the UE 101 may be selected to form the BPLs so as to improve the beam quality for the BPLs. In the following description, for ease of explanation only, it is assumed that the best Tx beams have already been selected to form the BPLs.

Figure 3:
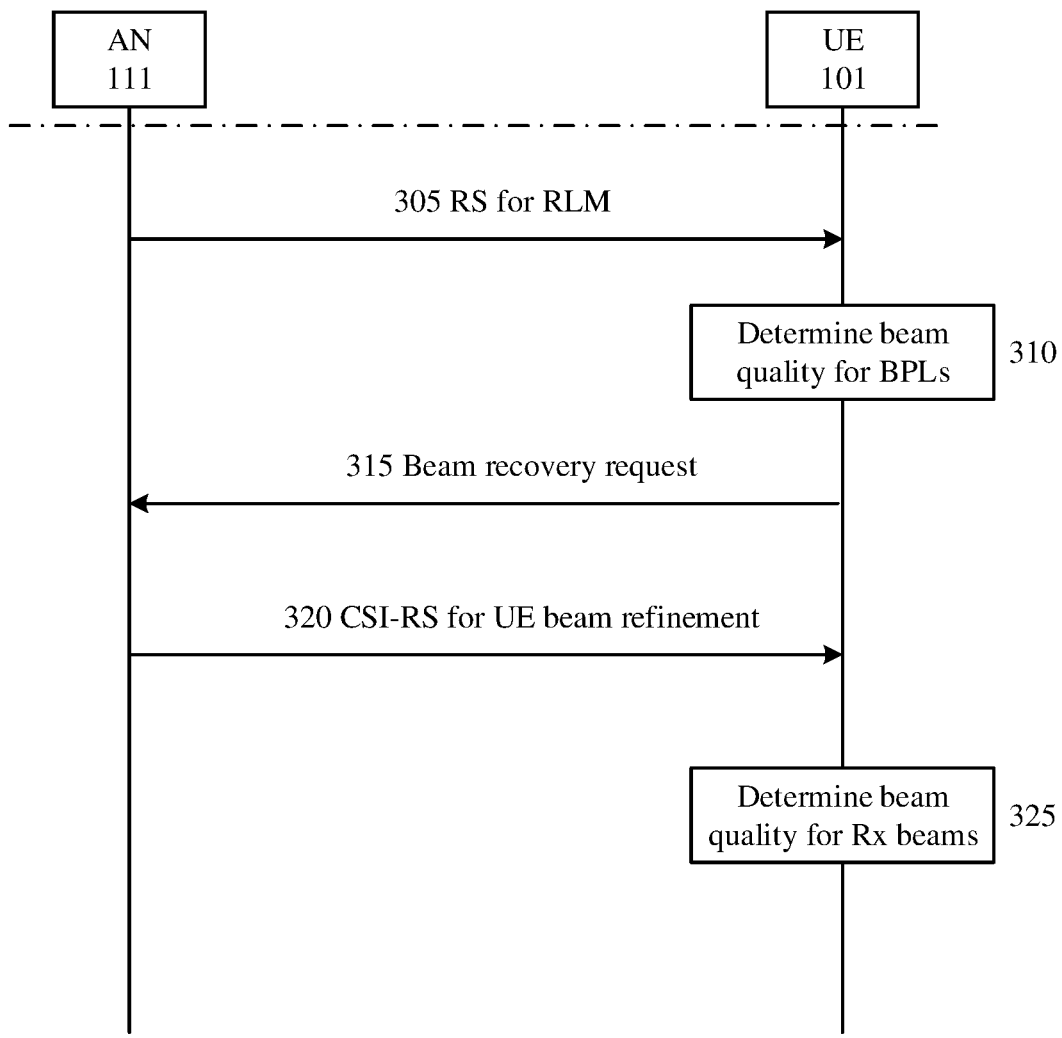
FIG. 3 is a flow chart showing operations for RLM in accordance with some embodiments of the disclosure.

FIG. 3 is a flow chart showing operations for RLM in accordance with some embodiments of the disclosure. The operations of FIG. 3 may be used for a UE (e.g. UE 101) to monitor a radio link between the UE and an AN (e.g. AN 111) of a RAN (e.g. RAN 110) based on a RS received from the AN.

At 305, AN 111 may process (e.g. modulate, encode, etc.) a RS and transmit the RS to UE 101 for RLM. In an embodiment, the RS may be transmitted with a beam sweeping operation. The RS may be a Synchronization Signal (SS) or a Channel State Information Reference Signal (CSI-RS), which may be pre-defined or configured by higher layer signaling. In an embodiment, a SS Block (SSB) may include a Primary SS (PSS), a secondary SS (SSS) and a Physical Broadcast Channel (PBCH). In an embodiment, a SSB may also include a Demodulation Reference Signal (DMRS) used for common control channel.

At 310, the UE 101 may receive and process (e.g. demodulate, decode, detect, etc.) the RS that the AN 111 transmitted at 305, to determine beam quality for one or more beam BPLs of the RS between the UE 101 and the AN 111 based on the processed RS. The beam quality for the BPLs may be determined by measuring Reference Signal Receiving Power (RSRP) or Reference Signal Receiving Quality (RSRQ) of the processed RS.

A first threshold may be configured by higher layer signaling for determining whether the UE 101 needs to process (e.g. modulate, encode, etc.) a beam recovery request for transmission to the AN 111. In an embodiment, at 315, the UE 101 may process (e.g. modulate, encode, etc.) a beam recovery request and transmit the beam recovery request to the AN 111 if the beam quality for all of the BPLs is below the first threshold. In another embodiment, at 315, the UE 101 may process (e.g. modulate, encode, etc.) a beam recovery request and transmit the beam recovery request to the AN 111 if the beam quality for all of the BPLs is below the first threshold for a predetermined or configured time period.

Alternatively, in addition to the first threshold, a second threshold may also be configured by higher layer signaling. In an embodiment, at 315, the UE 101 may process (e.g. modulate, encode, etc.) a beam recovery request and transmit the beam recovery request to the AN 111 if the beam quality for all of the BPLs is below the first threshold and above the second threshold. In another embodiment, at 315, the UE 101 may process (e.g. modulate, encode, etc.) a beam recovery request and transmit the beam recovery request to the AN 111 if the beam quality for all of the BPLs is below the first threshold and above the second threshold for a predetermined or configured time period. The beam recovery request may be directed to a predetermined number of BPLs among the BPLs, wherein the predetermined number may be pre-defined or configured by higher layer signaling or may be determined by the beam quality of the BPLs. In yet another embodiment, instead of processing (e.g. modulating, encoding, etc.) a beam recovery request for transmission to the AN 111 at 315, the UE 101 may directly determine that out-of-sync occurs if the beam quality for all of the BPLs is below the second threshold. In still another embodiment, instead of processing (e.g. modulating, encoding, etc.) a beam recovery request for transmission to the AN 111 at 315, the UE 101 may directly determine that out-of-sync occurs if the beam quality for all of the BPLs is below the second threshold for a predetermined or configured time period.

It is to be noted that, for the SS and CSI-RS, the thresholds discussed above may be the same or different.

In response to receiving and processing (e.g. demodulating, decoding, detecting, etc.) the beam recovery request that the UE 101 transmitted at 315, the AN 111 may process (e.g. modulate, encode, etc.) a Channel State Information Reference Signal (CSI-RS) and transmit the CSI-RS to the UE 101 for UE beam refinement at 320. The CSI-RS may be transmitted at pre-defined or pre-configured resources. If the beam recovery request is directed to a predetermined number of BPLs among the BPLs, the CSI-RS may be processed (e.g. modulated, encoded, etc.) with the predetermined number of Tx beams in the predetermined number of BPLs.

At 325, the UE 101 may receive and process (e.g. demodulate, decode, detect, etc.) the CSI-RS that the AN 111 transmitted at 320, to determine beam quality for one or more Rx beams of the UE based on the processed CSI-RS. The beam quality for the Rx beams may be determined by measuring Reference Signal Receiving Power (RSRP) or Reference Signal Receiving Quality (RSRQ) of the processed CSI-RS. The UE 101 may re-process (e.g. re-modulate, re-encode, etc.) the beam recovery request and re-transmit the beam recovery request to the AN 111, if no CSI-RS is received after the beam recovery request is transmitted at 320.

In an embodiment, the UE 101 may determine that out-of-sync occurs if the beam quality for the Rx beams is below the first threshold. In another embodiment, the UE 101 may determine that out-of-sync occurs if the beam quality for the Rx beams is below the first threshold for a predetermined or configured time period. In yet another embodiment, the UE 101 may determine that out-of-sync occurs if the beam quality for the Rx beams is below the first threshold and above the second threshold. In still another embodiment, the UE 101 may determine that out-of-sync occurs if the beam quality for the Rx beams is below the first threshold and above the second threshold for a predetermined or configured time period.

In addition, in an embodiment, the UE 101 may determine that in-synchronization (in-sync) occurs if the beam quality for the Rx beams is above a third threshold. In another embodiment, the UE 101 may determine that in-sync occurs if the beam quality for the Rx beams is above a third threshold for a predetermined or configured time period. The third threshold discussed above may be the same as or different from the first threshold.

The UE 101 may determine that radio link failure (RLF) occurs if the number of consecutive out-of-sync reaches a predetermined or configured number, wherein the predetermined or configured number may be determined based on capability of Rx beams of the UE.

Figure 4:
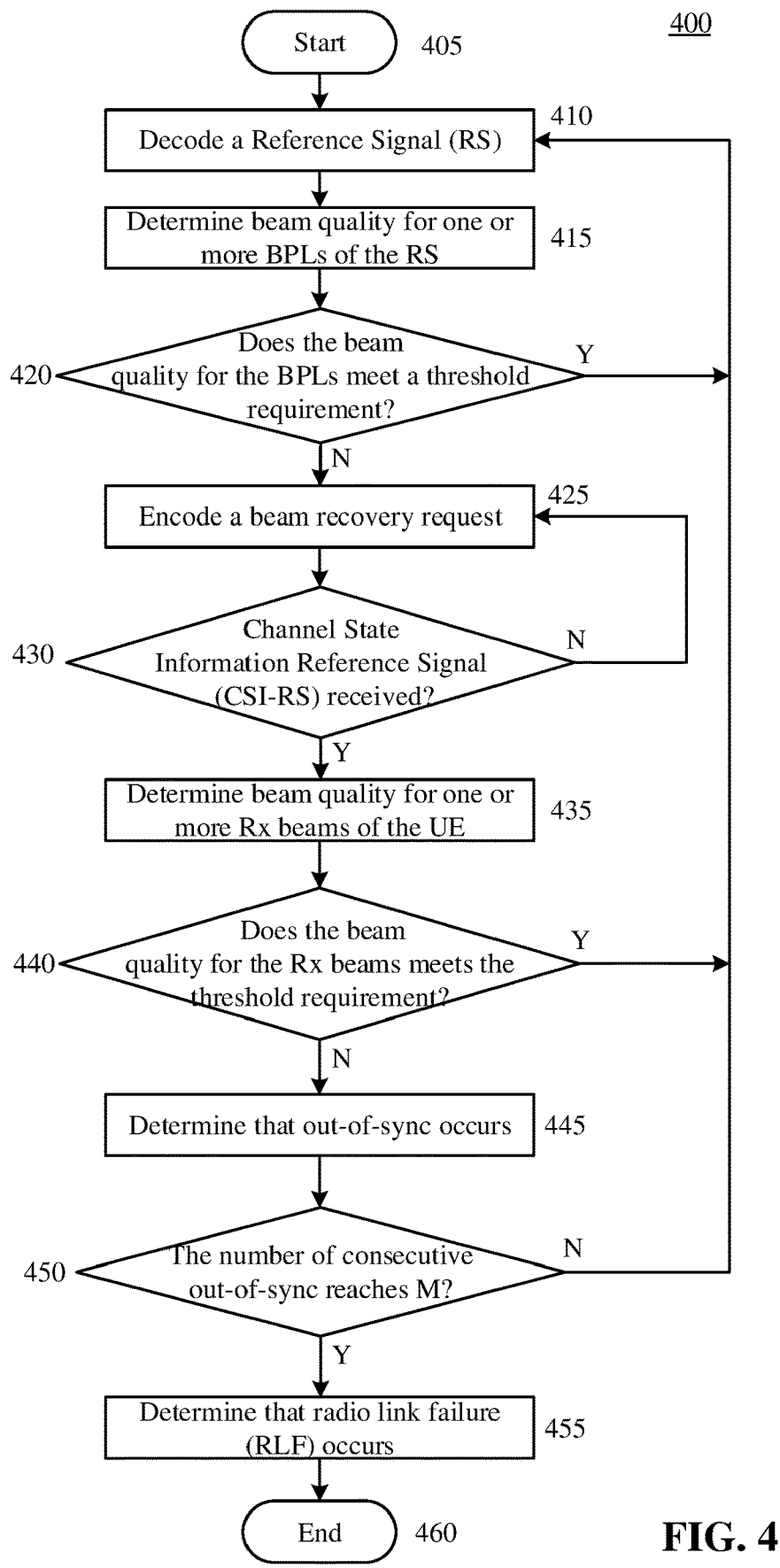
FIG. 4 is a flow chart showing a method performed by a UE during RLM in accordance with some embodiments of the disclosure.

FIG. 4 is a flow chart showing a method performed by a UE during RLM in accordance with some embodiments of the disclosure. The operations of FIG. 4 may be used for a UE (e.g. UE 101) to monitor a radio link between the UE and an AN (e.g. AN 111) of a RAN (e.g. RAN 110) based on a RS received from the AN.

The method starts at 405. At 410, the UE 101 may process (e.g. demodulate, decode, detect, etc.) a RS received from the AN 111. At 415, the UE 101 may determine beam quality for one or more beam BPLs of the RS between the UE 101 and the AN 111 based on the processed RS. As discussed hereinbefore, the beam quality for the BPLs may be determined by measuring Reference Signal Receiving Power (RSRP) or Reference Signal Receiving Quality (RSRQ) of the processed RS.

Then, the UE 101 may determine whether the beam quality for the BPLs meets a threshold requirement at 420. If yes, the method may return back to 410, and if not, the method may proceed to 425, where the UE 101 may process (e.g. modulate, encode, etc.) a beam recovery request for transmission to the AN 111. The threshold requirement may be configured by higher layer signaling, as discussed hereinbefore. In addition, although not shown, if the beam quality for the BPLs does not meet a threshold requirement at 420, the method may also proceed to 445 directly, namely, the UE 101 may directly determine that out-of-sync occurs, rather than processing (e.g. modulating, encoding, etc.) a beam recovery request for transmission to the AN 111 at 425.

The UE 101 may determine at 430 that if a Channel State Information Reference Signal (CSI-RS) has been received. If yes, the UE 101 may process (e.g. demodulate, decode, detect, etc.) the CSI-RS to determine beam quality for one or more Rx beams of the UE based on the processed CSI-RS at 435, and if not, the method may return back to 425. As discussed hereinbefore, the beam quality for the Rx beams may be determined by measuring Reference Signal Receiving Power (RSRP) or Reference Signal Receiving Quality (RSRQ) of the processed CSI-RS.

Then, the UE 101 may determine whether the beam quality for the Rx beams meets the threshold requirement at 440. If yes, the method may return back to 410, and if not, the method may proceed to 445, where the UE 101 may determine that out-of-sync occurs. The threshold requirement may be configured by higher layer signaling, as discussed hereinbefore. In addition, although not shown, the UE 101 may determine that in-sync occurs if the beam quality for the Rx beams meets the threshold requirement at 440.

Then, the UE 101 may determine whether the number of consecutive out-of-sync reaches a predetermined or configured number at 450. If yes, the UE 101 may determine that RLF occurs, and if not, the method may return back to 410. The method ends at 460.

Figure 5:
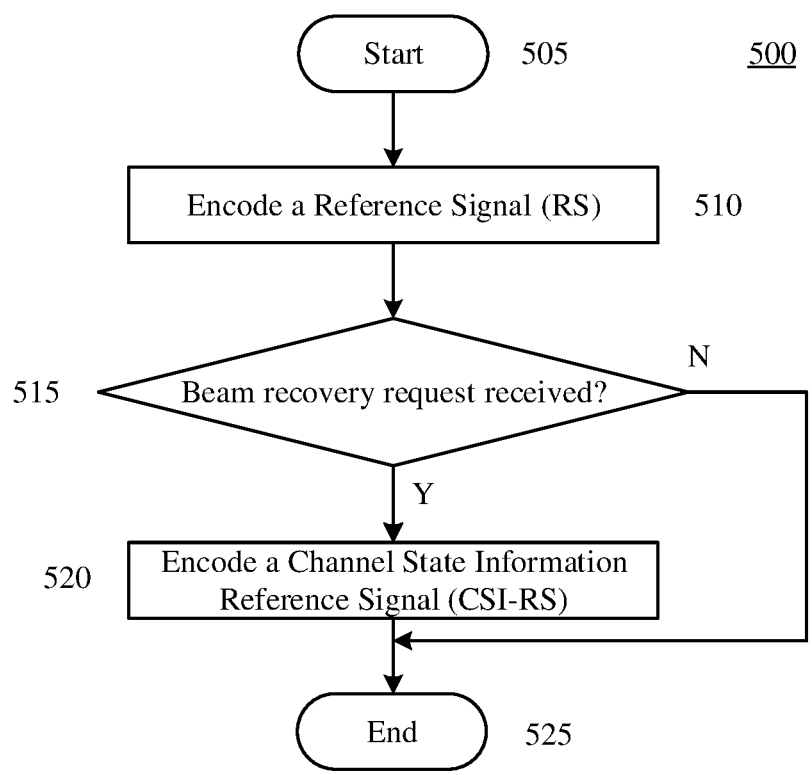
FIG. 5 is a flow chart showing a method performed by an access node during RLM in accordance with some embodiments of the disclosure.

FIG. 5 is a flow chart showing a method performed by an access node during RLM in accordance with some embodiments of the disclosure. The operations of FIG. 5 may be used for an AN (e.g. AN 111) of a RAN (e.g. RAN 110) to assist a UE (e.g. UE 101) to monitor the radio link between the UE and the AN based on a RS received from the AN. The method starts at 505. At 510, the AN 111 may process (e.g. modulate, encode, etc.) a RS and transmit the RS to the UE 101 for RLM. As discussed hereinbefore, the RS may be transmitted with a beam sweeping operation. The RS may be a Synchronization Signal (SS) or a Channel State Information Reference Signal (CSI-RS), which may be pre-defined or configured by higher layer signaling. In an embodiment, a SS Block (SSB) may include a Primary SS (PSS), a secondary SS (SSS) and a Physical Broadcast Channel (PBCH). In an embodiment, a SSB may also include a Demodulation Reference Signal (DMRS) used for common control channel.

The AN 111 may determine at 515 that if a beam recovery request has been received. If yes, the AN 111 may process (e.g. modulate, encode, etc.) a Channel State Information Reference Signal (CSI-RS) and transmit the CSI-RS to the UE 101 for UE beam refinement, and if not, the method may proceed to 525, where the method ends. As discussed hereinbefore, the CSI-RS may be transmitted at pre-defined or pre-configured resources. If the beam recovery request is directed to a predetermined number of BPLs, the CSI-RS may be processed (e.g. modulated, encoded, etc.) with the predetermined number of Tx beams in the predetermined number of BPLs.

Figure 6:
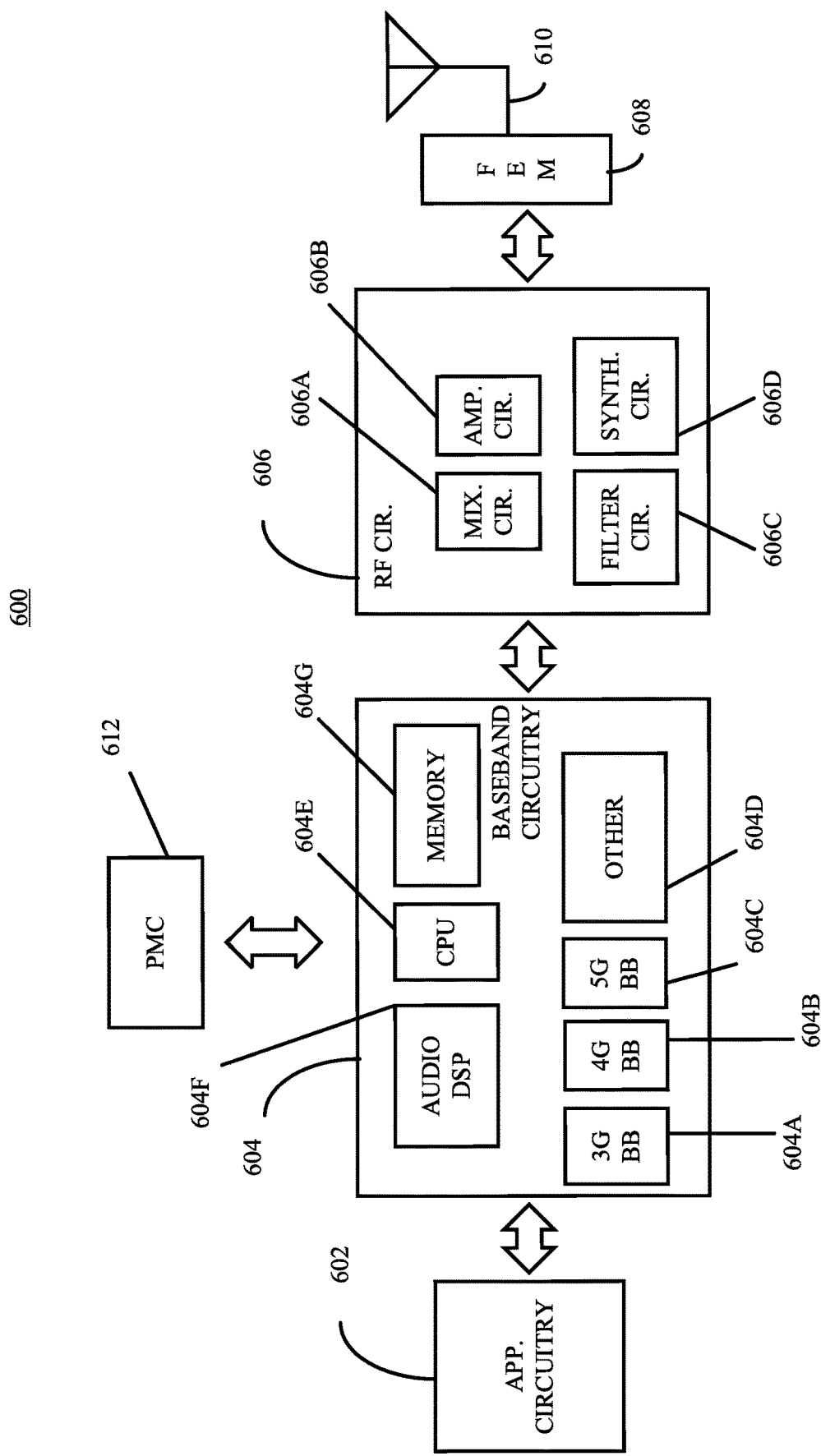
FIG. 6 illustrates example components of a device in accordance with some embodiments of the disclosure.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or an AN. In some embodiments, the device 600 may include less elements (e.g., an AN may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), si6h generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU- TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the AN as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer. As referred to herein, Layer 2 may comprise a medium access control (MAC) layer, a radio link control (RLC) layer, and a packet data convergence protocol (PDCP) layer, Layer 1 may comprise a physical (PHY) layer of a UE/AN.

Figure 7:
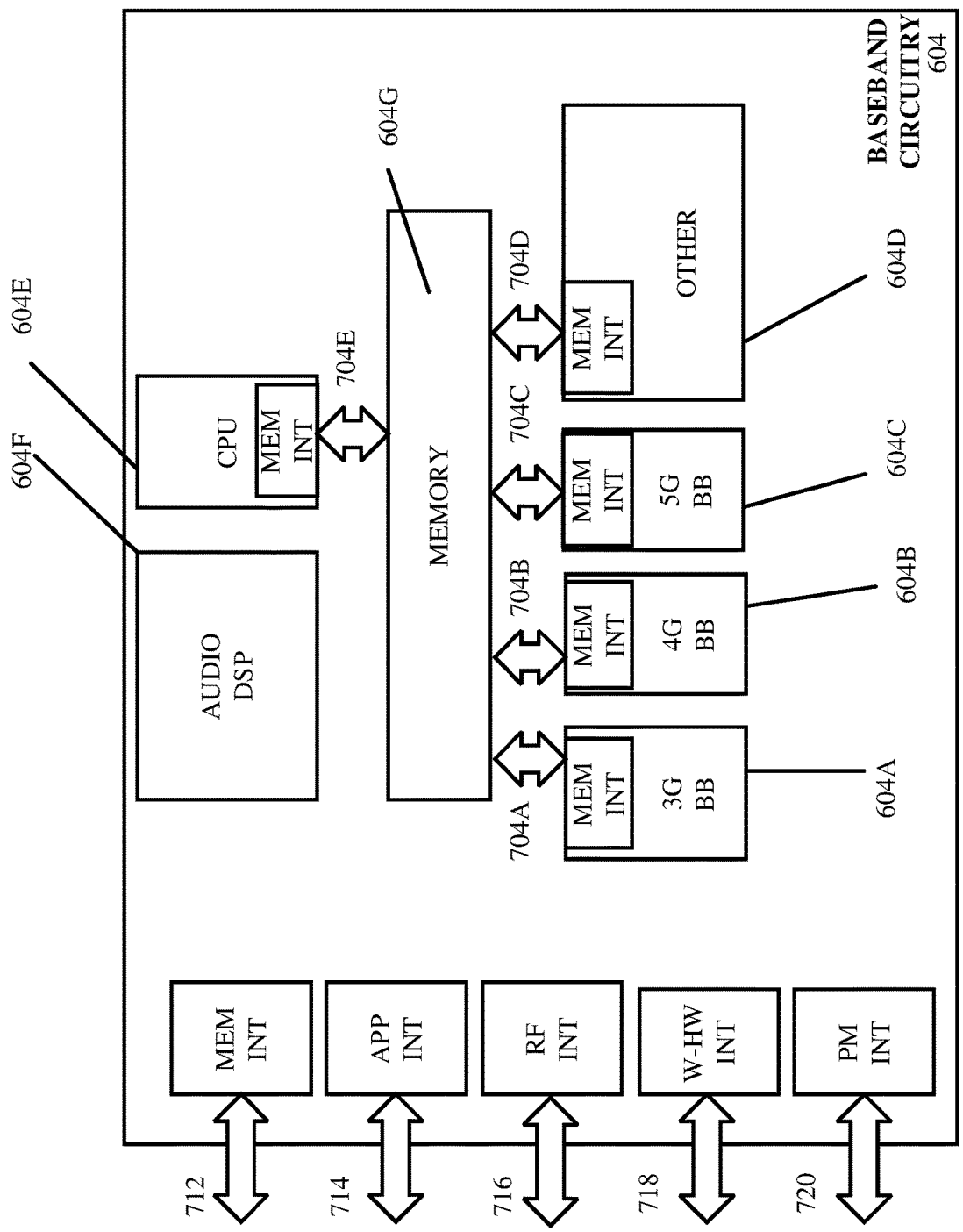
FIG. 7 illustrates example interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
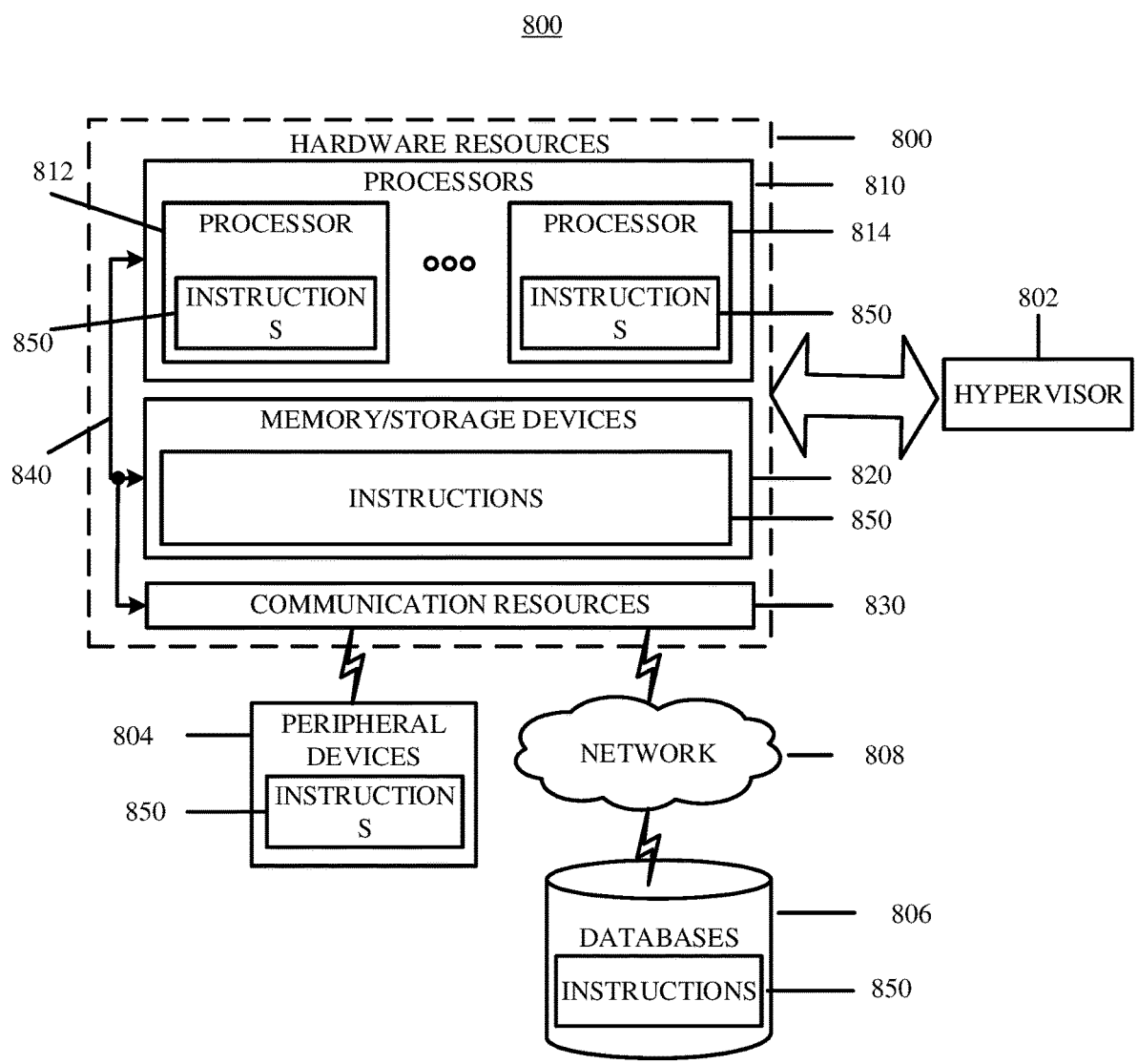
FIG. 8 is a block diagram illustrating components, according to some example embodiments, able to read instructions from a machine-readable or computer-readable medium and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

The following paragraphs describe examples of various embodiments. Example 1 includes an apparatus for a user equipment (UE), including circuitry configured to: decode a Reference Signal (RS) received from an access node; and determine beam quality for one or more beam pair links (BPLs) of the RS between the UE and the access node based on the decoded RS, wherein each of the BPLs comprises a transmit (Tx) beam of the access node and a receive (Rx) beam of the UE.

Example 2 includes the apparatus of Example 1, wherein the RS is a Synchronization Signal (SS) or a Channel State Information Reference Signal (CSI-RS), as pre-defined or configured by higher layer signaling.

Example 3 includes the apparatus of Example 1, wherein the beam quality for the BPLs is determined by measuring Reference Signal Receiving Power (RSRP) or Reference Signal Receiving Quality (RSRQ) of the decoded RS.

Example 4 includes the apparatus of Example 1, wherein the circuitry is further configured to determine that out-of-sync occurs if the beam quality for all of the BPLs is below a first threshold.

Example 5 includes the apparatus of Example 1, wherein the circuitry is further configured to determine that out-of-sync occurs if the beam quality for all of the BPLs is below a first threshold for a predetermined or configured time period.

Example 6 includes the apparatus of Example 1, wherein the circuitry is further configured to encode a beam recovery request for transmission to the access node if the beam quality for all of the BPLs is below a first threshold.

Example 7 includes the apparatus of Example 1, wherein the circuitry is further configured to encode a beam recovery request for transmission to the access node if the beam quality for all of the BPLs is below a first threshold for a predetermined or configured time period.

Example 8 includes the apparatus of Example 1, wherein the circuitry is further configured to encode a beam recovery request for transmission to the access node if the beam quality for all of the BPLs is below a first threshold and above a second threshold.

Example 9 includes the apparatus of Example 1, wherein the circuitry is further configured to encode a beam recovery request for transmission to the access node if the beam quality for all of the BPLs is below a first threshold and above a second threshold for a predetermined or configured time period.

Example 10 includes the apparatus of any of Examples 6-9, wherein the beam recovery request is for a predetermined number of BPLs among the BPLs, wherein the predetermined number is pre-defined or configured by higher layer signaling or is determined by the beam quality of the BPLs.

Example 11 includes the apparatus of any of Examples 6-9, wherein the circuitry is further configured to: decode Channel State Information Reference Signal (CSI-RS), wherein the CSI-RS is transmitted from the access node in response to the beam recovery request; and determine beam quality for one or more Rx beams of the UE based on the decoded CSI-RS.

Example 12 includes the apparatus of Example 11, wherein the beam quality for the Rx beams is determined by measuring Reference Signal Receiving Power (RSRP) or Reference Signal Receiving Quality (RSRQ) of the decoded CSI-RS.

Example 13 includes the apparatus of Example 11, wherein the circuitry is further configured to determine that out-of-sync occurs if the beam quality for the Rx beams is below the first threshold.

Example 14 includes the apparatus of Example 11, wherein the circuitry is further configured to determine that out-of-sync occurs if the beam quality for the Rx beams is below the first threshold for a predetermined or configured time period.

Example 15 includes the apparatus of Example 11, wherein the circuitry is further configured to determine that out-of-sync occurs if the beam quality for the Rx beams is below the first threshold and above the second threshold.

Example 16 includes the apparatus of Example 11, wherein the circuitry is further configured to determine that out-of-sync occurs if the beam quality for the Rx beams is below the first threshold and above the second threshold for a predetermined or configured time period.

Example 17 includes the apparatus of Example 11, wherein the circuitry is further configured to determine that in-sync occurs if the beam quality for the Rx beams is equal to or greater than the first threshold.

Example 18 includes the apparatus of Example 11, wherein the circuitry is further configured to determine that in-sync occurs if the beam quality for the Rx beams is equal to or greater than the first threshold for a predetermined or configured time period.

Example 19 includes the apparatus of Examples 4-5 or 13-16, wherein the circuitry is further configured to determine that radio link failure (RLF) occurs if the number of consecutive out-of-sync reaches a predetermined or configured number.

Example 20 includes the apparatus of Example 19, wherein the predetermined or configured number is determined based on capability of Rx beams of the UE.

Example 21 includes the apparatus of any of Examples 6-9, wherein the circuitry is further configured to re-encode the beam recovery request for transmission to the access node, if no Channel State Information Reference Signal (CSI-RS) is received after transmitting the beam recovery request.

Example 22 includes an apparatus for an access node, including circuitry configured to: encode a Reference Signal (RS) for transmission to a user equipment (UE); decode a beam recovery request for one or more beam pair links (BPLs) of the RS between the UE and the access node received from the UE, wherein each of the BPLs comprises a transmit (Tx) beam of the access node and a receive (Rx) beam of the UE; and encode a Channel State Information Reference Signal (CSI-RS) for transmission to the UE in response to decoding the beam recovery request.

Example 23 includes the apparatus of Example 22, wherein the RS is a Synchronization Signal (SS) or a Channel State Information Reference Signal (CSI-RS).

Example 24 includes the apparatus of Example 22, wherein the CSI-RS is transmitted at pre-defined or pre-configured resources.

Example 25 includes the apparatus of Example 22, wherein the beam recovery request is for a predetermined number of BPLs among the BPLs.

Example 26 includes the apparatus of Example 25, wherein the CSI-RS is encoded with the predetermined number of Tx beams in the predetermined number of BPLs.

Example 27 includes a method performed at a user equipment (UE), including: decoding a Reference Signal (RS) received from an access node; and determining beam quality for one or more beam pair links (BPLs) of the RS between the UE and the access node based on the decoded RS, wherein each of the BPLs comprises a transmit (Tx) beam of the access node and a receive (Rx) beam of the UE.

Example 28 includes the method of Example 27, wherein the RS is a Synchronization Signal (SS) or a Channel State Information Reference Signal (CSI-RS), as pre-defined or configured by higher layer signaling.

Example 29 includes the method of Example 27, wherein the beam quality for the BPLs is determined by measuring Reference Signal Receiving Power (RSRP) or Reference Signal Receiving Quality (RSRQ) of the decoded RS.

Example 30 includes the method of Example 27, wherein the method further includes determining that out-of-sync occurs if the beam quality for all of the BPLs is below a first threshold.

Example 31 includes the method of Example 27, wherein the method further includes determining that out-of-sync occurs if the beam quality for all of the BPLs is below a first threshold for a predetermined or configured time period.

Example 32 includes the method of Example 27, wherein the method further includes encoding a beam recovery request for transmission to the access node if the beam quality for all of the BPLs is below a first threshold.

Example 33 includes the method of Example 27, wherein the method further includes encoding a beam recovery request for transmission to the access node if the beam quality for all of the BPLs is below a first threshold for a predetermined or configured time period.

Example 34 includes the method of Example 27, wherein the method further includes encoding a beam recovery request for transmission to the access node if the beam quality for all of the BPLs is below a first threshold and above a second threshold.

Example 35 includes the method of Example 27, wherein the method further includes encoding a beam recovery request for transmission to the access node if the beam quality for all of the BPLs is below a first threshold and above a second threshold for a predetermined or configured time period.

Example 36 includes the method of any of Examples 32-35, wherein the beam recovery request is for a predetermined number of BPLs among the BPLs, wherein the predetermined number is pre-defined or configured by higher layer signaling or is determined by the beam quality of the BPLs.

Example 37 includes the method of Example 27, wherein the method further includes: decoding Channel State Information Reference Signal (CSI-RS), wherein the CSI-RS is transmitted from the access node in response to the beam recovery request; and determining beam quality for one or more Rx beams of the UE based on the decoded CSI-RS.

Example 38 includes the method of Example 37, wherein the beam quality for the Rx beams is determined by measuring Reference Signal Receiving Power (RSRP) or Reference Signal Receiving Quality (RSRQ) of the decoded CSI-RS.

Example 39 includes the method of Example 37, wherein the method further includes determining that out-of-sync occurs if the beam quality for the Rx beams is below the first threshold.

Example 40 includes the method of Example 37, wherein the method further includes determining that out-of-sync occurs if the beam quality for the Rx beams is below the first threshold for a predetermined or configured time period.

Example 41 includes the method of Example 37, wherein the method further includes determining that out-of-sync occurs if the beam quality for the Rx beams is below the first threshold and above the second threshold.

Example 42 includes the method of Example 37, wherein the method further includes determining that out-of-sync occurs if the beam quality for the Rx beams is below the first threshold and above the second threshold for a predetermined or configured time period.

Example 43 includes the method of Example 37, wherein the method further includes determining that in-sync occurs if the beam quality for the Rx beams is equal to or greater than the first threshold.

Example 44 includes the method of Example 37, wherein the method further includes determining that in-sync occurs if the beam quality for the Rx beams is equal to or greater than the first threshold for a predetermined or configured time period.

Example 45 includes the method of Examples 30-31 or 39-42, wherein the method further includes determining that radio link failure (RLF) occurs if the number of consecutive out-of-sync reaches a predetermined or configured number.

Example 46 includes the method of Example 45, wherein the predetermined or configured number is determined based on capability of Rx beams of the UE.

Example 47 includes the method of any of Examples 32-35, wherein the method further includes re-encoding the beam recovery request for transmission to the access node, if no Channel State Information Reference Signal (CSI-RS) is received after transmitting the beam recovery request.

Example 48 includes a method performed by an access node, including: encoding a Reference Signal (RS) for transmission to a user equipment (UE); decoding a beam recovery request for one or more beam pair links (BPLs) of the RS between the UE and the access node received from the UE, wherein each of the BPLs comprises a transmit (Tx) beam of the access node and a receive (Rx) beam of the UE; and encoding a Channel State Information Reference Signal (CSI-RS) for transmission to the UE in response to decoding the beam recovery request.

Example 49 includes the method of Example 48, wherein the RS is a Synchronization Signal (SS) or a Channel State Information Reference Signal (CSI-RS).

Example 50 includes the method of Example 48, wherein the CSI-RS is transmitted at pre-defined or pre-configured resources.

Example 51 includes the method of Example 48, wherein the beam recovery request is for a predetermined number of BPLs among the BPLs.

Example 52 includes the method of Example 51, wherein the CSI-RS is encoded with the predetermined number of Tx beams in the predetermined number of BPLs.

Example 53 includes a non-transitory computer-readable medium having instructions stored thereon, the instructions when executed by one or more processor(s) causing the processor(s) to perform the method of any of Examples 27-52.

Example 54 includes an apparatus for a user equipment (UE), including means for performing the actions of the method of any of Examples 27-47.

Example 55 includes an apparatus for an access node (AN), including means for performing the actions of the method of any of Examples 48-52.

Example 56 includes a user equipment (UE) as shown and described in the description.

Example 57 includes an access node (AN) as shown and described in the description.

Example 58 includes a method performed at a user equipment (UE) as shown and described in the description.

Example 59 includes a method performed at an access node (AN) as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. One or more non-transitory, computer-readable media having instructions that, when executed by one or more processors, cause a user equipment (UE) to:
   determine one or more beam pair links (BPLs), wherein respective ones of the BPLs include a transmit (Tx) beam of an access node and a receive (Rx) beam of the UE;
   decode a Reference Signal (RS) received from an access node, the reference signal related to radio link monitoring (RLM);
   determine, at least partially based on the RS, beam quality for the one or more BPLs;
   determine that the beam quality for the one or more BPLs is below a first threshold;
   in response to determining that the beam quality for the one or more BPLs is below the first threshold, identify an occurrence of out-of-sync;
   determine that a number of consecutive out-of-syncs has reached a predetermined or configured number; and
   in response to determining that the number of consecutive out-of-syncs has reached the predetermined or configured number, determine occurrence of radio link failure (RLF).

2. The one or more non-transitory, computer-readable media of claim 1, wherein the RS is a Synchronization Signal (SS) or a Channel State Information Reference Signal (CSI-RS), as pre-defined or configured by higher layer signaling.

3. The one or more non-transitory, computer-readable media of claim 1, wherein the beam quality for the BPLs is determined by measuring Reference Signal Receiving Power (RSRP) or Reference Signal Receiving Quality (RSRQ) of the decoded RS.

4. The one or more non-transitory, computer-readable media of claim 1, wherein the instructions, when executed, further cause the UE to determine that out-of-sync occurs if the beam quality for the one or more BPLs is below the first threshold for a predetermined or configured time period.

5. The one or more non-transitory, computer-readable media of claim 1, wherein the instructions, when executed, further cause the UE to encode a beam recovery request for transmission to the access node if the beam quality for the one or more BPLs is below the first threshold.

6. The one or more non-transitory, computer-readable media of claim 1, wherein the instructions, when executed, further cause the UE to encode a beam recovery request for transmission to the access node if the beam quality for the one or more BPLs is below the first threshold for a predetermined or configured time period.

7. The one or more non-transitory, computer-readable media of claim 1, wherein the instructions, when executed, further cause the UE to encode a beam recovery request for transmission to the access node if the beam quality for the one or more BPLs is below the first threshold and above a second threshold.

8. The one or more non-transitory, computer-readable media of claim 1, wherein the instructions, when executed, further cause the UE to encode a beam recovery request for transmission to the access node if the beam quality for the one or more BPLs is below the first threshold and above a second threshold for a predetermined or configured time period.

9. The one or more non-transitory, computer-readable media of claim 1, wherein the predetermined or configured number is determined at least partially based on capability of Rx beams of the UE.

10. The one or more non-transitory, computer-readable media of claim 5, wherein the beam recovery request is for a predetermined number of BPLs among the BPLs, wherein the predetermined number is pre-defined or configured by higher layer signaling or is determined by the beam quality of the BPLs.

11. The one or more non-transitory, computer-readable media of claim 5, wherein the instructions, when executed, further cause the UE to:
   decode Channel State Information Reference Signal (CSI-RS), wherein the CSI-RS is transmitted from the access node in response to the beam recovery request; and
   determine beam quality for one or more Rx beams of the UE at least partially based on the decoded CSI-RS.

12. The one or more non-transitory, computer-readable media of claim 5, wherein the instructions, when executed, further cause the UE to re-encode the beam recovery request for transmission to the access node, if no Channel State Information Reference Signal (CSI-RS) is received after transmitting the beam recovery request.

13. The one or more non-transitory, computer-readable media of claim 11, wherein the beam quality for the Rx beams is determined by measuring Reference Signal Receiving Power (RSRP) or Reference Signal Receiving Quality (RSRQ) of the decoded CSI-RS.

14. The one or more non-transitory, computer-readable media of claim 11, wherein the instructions, when executed, further cause the UE to determine that out-of-sync occurs if the beam quality for the Rx beams is below the first threshold.

15. The one or more non-transitory, computer-readable media of claim 11, wherein the instructions, when executed, further cause the UE to determine that out-of-sync occurs if the beam quality for the Rx beams is below the first threshold for a predetermined or configured time period.

16. The one or more non-transitory, computer-readable media of claim 11, wherein the instructions, when executed, further cause the UE to determine that out-of-sync occurs if the beam quality for the Rx beams is below the first threshold and above a second threshold.

17. The one or more non-transitory, computer-readable media of claim 11, wherein the instructions, when executed, further cause the UE to determine that out-of-sync occurs if the beam quality for the Rx beams is below the first threshold and above a second threshold for a predetermined or configured time period.

18. The one or more non-transitory, computer-readable media of claim 11, wherein the instructions, when executed, further cause the UE to determine that in-sync occurs if the beam quality for the Rx beams is equal to or greater than the first threshold.

19. An apparatus for an access node, comprising:
   interface circuitry; and
   baseband circuitry, coupled with the interface circuitry, to
      encode a Reference Signal (RS) for transmission to a user equipment (UE) via the interface circuitry, the RS related to a quality of a beam pair link (BPL) that includes a transmit (Tx) beam of the access node and a receive (Rx) beam of the UE, wherein the BPL is one of a plurality of BPLs between the access node and the UE;
      decode, at least partially based on the quality of the BPL, a beam recovery request received from the UE, wherein the beam recovery request indicates a specified number of BPLs of the plurality of BPLs; and
      encode, via the interface circuitry in response to decoding the beam recovery request, a Channel State Information Reference Signal (CSI-RS) corresponding to the specified number of BPLs for transmission to the UE.

20. The apparatus of claim 19, wherein the RS is a Synchronization Signal (SS) or a Channel State Information Reference Signal (CSI-RS).

21. The apparatus of claim 19, wherein the CSI-RS is transmitted at pre-defined or pre- configured resources.

22. The apparatus of claim 20, wherein the CSI-RS is encoded with a specified number of Tx beams corresponding to the specified number of BPLs.

23. An apparatus for a user equipment (UE), the apparatus comprising:
   one or more processors; and
   memory storing instructions that, when executed, cause the one or more processors to perform operations comprising:
      determine a plurality of beam pair links (BPLs), wherein respective ones of the BPLs include a transmit (Tx) beam of an access node and a receive (Rx) beam of the UE;
      decode a Reference Signal (RS) received from an access node, the reference signal related to radio link monitoring (RLM);
      determine, based at least on the RS, beam quality for the plurality of BPLs;
      determine that the beam quality for one or more BPLs of the plurality of BPLs is below a first threshold;
      in response to determining that the beam quality for the one or more BPLs is below the first threshold, transmit a beam recovery request to the access node, the beam recovery request indicating a specified number of BPLs of the one or more BPLs determined to have beam quality below the first threshold;
      receiving a Channel State Information Reference Signal (CSI-RS) transmitted from the access node in response to the beam recovery request, the CSI-RS corresponding to the specified number of BPLs in the beam recovery request; and
      determining beam quality for one or more Rx beams of the UE based at least on the CSI-RS.

\* \* \* \* \*